Patented Aug. 2, 1949

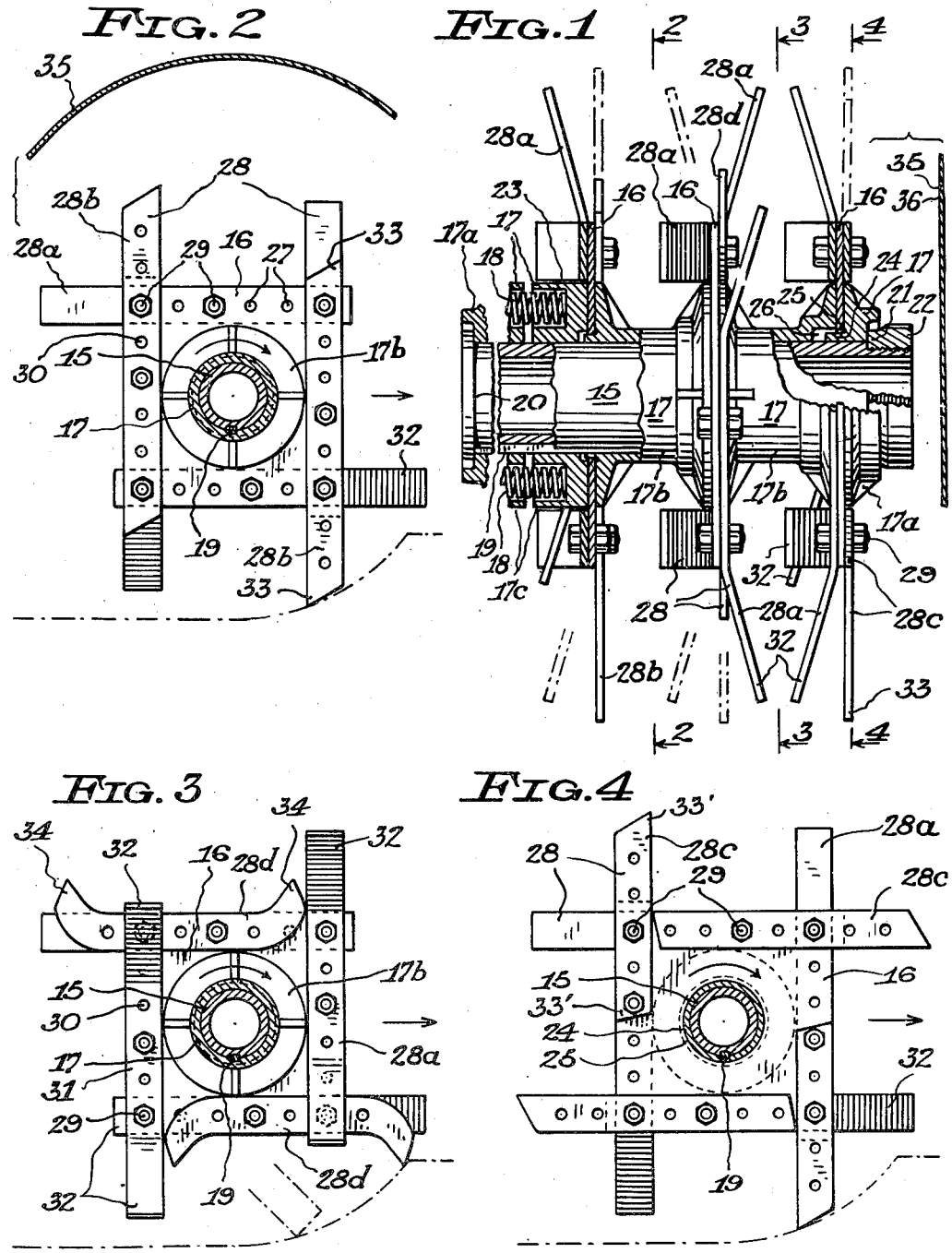

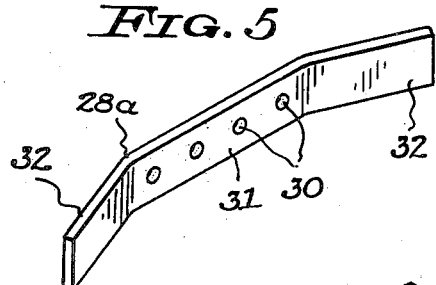
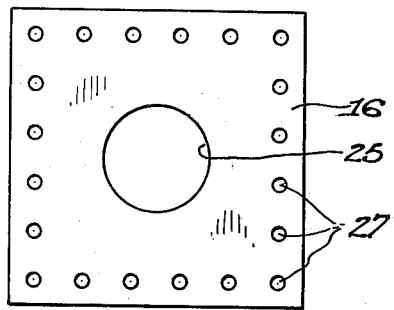
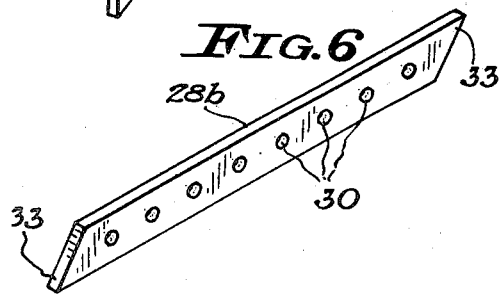
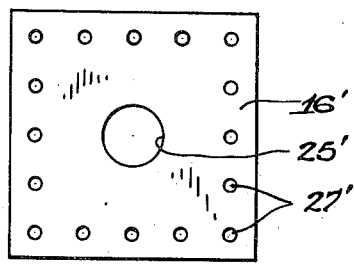
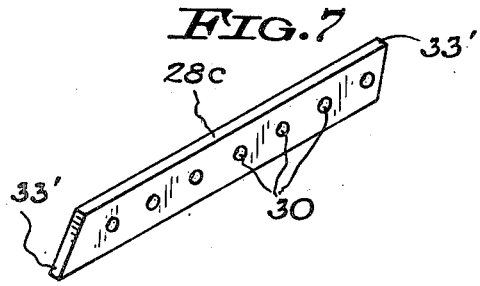
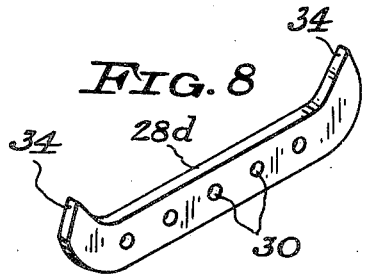

2,477,662

UNITED STATES PATENT OFFICE 2,477,662

ROTARY EARTH-WORKING IMPLEMENT

Harry J. Seaman, Milwaukee, Wis.

Application December 21, 1944, Serial No. 569,160

1 Claim. (Cl. 97—212)

The present invention relates to rotary implements adapted for digging, pulverizing, mixing, and otherwise working various materials, as in soil cultivation and road building.

An object of the invention is to provide an improved rotary implement which is so constructed as to permit various arrangements of ground-working tools thereon and to obtain a long service life for the tools.

Another object is to provide a rotary implement having a reversible tool with material-working portions at opposite ends.

A further object is to provide a rotary implement which shall permit ready adjustment of the tools to vary the cutting radius.

A still further object is to provide a rotary implement which is of strong and durable construction and which can be inexpensively manufactured.

The invention further consists in the several features hereinafter described and claimed.

In the accompanying drawings, illustrating certain embodiments of the invention.

Fig. 1 is a rear elevation of a rotary implement constructed in accordance with the invention, parts being broken away and parts being shown in section;

Fig. 2 is a transverse sectional elevation taken generally on the line 2—2 of Fig. 1;

Fig. 3 is a transverse sectional elevation taken generally on the line 3—3 of Fig. 1;

Fig. 4 is a transverse sectional elevation taken generally on the line 4—4 of Fig. 1;

Fig. 5 is a perspective view of one form of tine or tool member;

Fig. 6 is a perspective view of another form of tool member;

Fig. 7 is a perspective view of still another form of tool member;

Fig. 8 is a perspective view of a further form of tool member;

Fig. 9 is a detail face view of a tool mounting plate, and

Fig. 10 is a detail face view of another form of tool mounting plate.

In these drawings, the numeral 15 designates the rotary tool shaft of a ground-working implement. The tool shaft, which is arranged horizontally, is power-driven in any suitable manner, and is here shown to be of tubular form. The tool shaft extends transversely of the direction of travel of the implement, the path of the implement travel being indicated by horizontal arrows in Figs. 2, 3, and 4, and the direction of rotation of the tool shaft being also indicated by arrows in these figures.

The tool shaft carries thereon a series of axially spaced flat tool mounting plates 16 which preferably have friction clutch connections with the shaft in order to permit slipping under excessive load. In some cases, however, these plates may be rigidly secured to the shaft against relative rotation, as by welding, not shown. Three plates 16 are shown but in practice more are usually provided. In the present instance, the shaft carries clutch members 17 which have flat end faces perpendicular to the axis of the shaft and frictionally engaging the mounting plates under the axial pressure of coiled springs 18. The clutch members are axially slidable on the shaft and are driven therefrom by a spline key 19. The series of clutch members and mounting plates are confined between axially spaced shoulders 20 and 21 on the shaft, one shoulder being formed on a nut 22 secured onto the free end of the shaft. The clutch members are here shown to be of three types, designated 17a, 17b, and 17c. The members 17a are end collars, and the members 17b are spool-shaped spacers. The opposed members 17c are provided with pockets 23 to receive the springs 18. Each clutch member has an end embossment or nipple 24 movably fitting in a central opening 25 in the adjacent mounting plate, and extending into a clearance counterbore 26 in the opposed clutch member.

Each tool mounting plate 16, which is of steel or other suitable metal, is preferably square in shape and is provided near each edge portion with a row of bolt openings 27 which extend transversely through the plate, the four rows of openings forming a square pattern, as best seen in Fig. 9.

Each mounting plate detachably carries thereon a number of angularly spaced ground-working tools or tines designated generally by the numeral 28 and here shown to be of several types 28a, 28b, 28c, and 28d. Each tool is formed from a length of flat bar stock, preferably resilient steel, and has a portion abutting flatwise against a face of the associated mounting plate adjacent and parallel to an edge of the plate. The tool is secured to the plate by bolts 29 which pass through selected ones of a series of openings 30 in the tool and through selected openings 27 in the plate.

Each tool 28a, shown in detail in Fig. 5, has a flat intermediate portion 31 provided with the series of the openings 30, and has opposite end portions 32 which are bent or laterally deflected to one side of the plane of the intermediate portion. Although the different tools may be arranged on the mounting plates in various ways, each plate preferably carries at least one pair of the tools 28a. The plate of Fig. 2 carries two pairs of the tools 28a, all at one side; the plate of Fig. 3 carries two pairs of these tools, one pair on each side; and the plate of Fig. 4 carries two pairs of these tools, all at one side.

Each tool 28b, shown in detail in Figs. 2 and 6, is straight throughout its length and is provided with a series of the bolt openings 30. Each of the opposite ends of each tool 28b is here shown to have a scarifying point 33. The plate of Fig. 2 is shown to carry at one side face thereof two of the opposed tools 28b in parallel relation, the other side face carrying four of the tools 28a. The four corner bolts 29 pass through both sets of tools.

Each tool 28c, shown in Figs. 4 and 7, is similar to the tool 28b except that it is shorter, permitting four of the tools 28c to be carried on one side of the plate, as best seen in Fig. 4. The tools 28c have scarifying points 33' at opposite ends. Even if the tool end is square it will tend to assume a pointed shape after wear occurs.

Each tool 28d, shown in Figs. 1, 3 and 8, has opposite hooked scarifying or digging points 34, the outermost of which (with respect to the axis of the shaft) projects in the direction of rotation, and the other point projecting from an edge of the mounting plate. Both points preferably extend from the same edge of the tool, although, in some instances, these points may project from opposite edges.

One free end 32 of each tool 28a is at a greater radius from the center of the shaft than the other tool end, and determines the cutting depth of the tool. The other angularly deflected end 32 of the tool, however, projects sufficiently far from the shaft axis to have a material-working action, especially during deep tilling or mixing. As seen in Fig. 1, the latter tool end portion is spaced laterally from the adjacent corner bolt which secures other tools to the plate, thus avoiding interference with this bolt. The main cutting end of each tool 28a is angularly rearward of the anchored portion of this tool.

Referring to Fig. 2, it will be seen that one free end of each tool 28b is at a greater radius from the center of the shaft than the other end of the tool. The latter tool end, however, will nevertheless have a material-working action. Two adjacent corner bolts are shown to pass through each tool 28b. The main cutting end of each tool 28b is angularly in advance of the anchored portion of this tool.

Referring to Fig. 4, the inner ends of the two horizontal tools 28c are close to the side edges of the two vertical tools 28c, all of these tools lying in the same plane. The two vertical tools 28c have been displaced outwardly to compensate for wear. Referring to Figs. 1 and 3, the two hooked tools 28d are secured to one side of the mounting plate, the associated corner bolts 29 also passing through the tools 28a at the other side of the plate. Both ends of the tools 28d have a material-working action.

The implement is usually provided with a hood 35, a vertical end wall 36 of which is spaced a short distance from the free end of the tool shaft.

In operation, the tool shaft 15 is driven at a suitable rate of speed, usually several hundred revolutions per minute, from a convenient source of power, such as an internal combustion engine, not shown. The entire implement is moved slowly over the ground to be worked, the direction of rotation of the tool shaft being such as to assist the forward movement of the implement. During their rotation, the tools dig into the ground or other material being worked and have a cutting, pulverizing, and mixing action on the material.

After the main cutting ends of the tools become worn, these double-ended tools can be removed from the mounting plates, turned end for end, and then refastened to the plates, thus restoring the original cutting radius. After further wear, the tools can be removed from the plates and be rebolted thereon in outwardly shifted position. The tools and the mounting plates are so constructed as to permit several reversals and outward shifts of the tools, thus permitting a great deal of service to be obtained from the tools. The longitudinal shifting of the tools is also useful for adjusting the cutting radius of the tools.

Each tool mounting unit is such that only a relatively few bolts are required for the several tools, and various tool arrangements can be provided. The relation of the anchored end portions of the tools with respect to each mounting plate also serves to reinforce this plate, the tools being arranged in an endless chain about the plate.

When the implement is used in agriculture it is often desirable to provide several sets of tools to meet various tilling conditions. These tools may be carried on different sets of tool mounting plates, or they may be separate from the mounting plates. The tools and mounting plates can be quickly changed in the field.

The same tools can also be used interchangeably on mounting plates of different size, a mounting plate 16' of smaller size being shown in Fig. 10. The plate 16' is provided with bolt openings 27' arranged in a square pattern and spaced to suit the tools, and is further provided with a central opening 25'.

What I claim as new and desire to secure by Letters Patent is:

In a rotary implement, a rotatable mounting plate having transverse openings, a tool member having laterally deflected material-working portions at opposite ends, fastening elements securing an intermediate portion of said tool member to said plate and passing through some of said openings, a second tool member, and fastening elements for said second tool member, one of the laterally deflected end portions of said first-named tool member being laterally spaced from one of said last-named fastening elements.

HARRY J. SEAMAN.

REFERENCES CITED

The following references are of record in the file of this patent:

UNITED STATES PATENTS

| Number | Name | Date |
| --- | --- | --- |
| 273,101 | Kay | Feb. 27, 1883 |
| 438,040 | Warren | Oct. 7, 1890 |
| 1,145,653 | Anderson | July 5, 1915 |
| 1,217,326 | Meinecke | Feb. 27, 1917 |
| 1,258,882 | Dremel | Mar. 12, 1918 |
| 2,199,954 | Kelsey | May 7, 1940 |

FOREIGN PATENTS

| Number | Country | Date |
| --- | --- | --- |
| 16,408 | Sweden | Sept. 19, 1903 |
| 48,793 | Denmark | May 14, 1934 |
| 785,408 | France | Mar. 20, 1935 |